March 21, 1933.  C. G. TRIMBACH  1,902,107
MACHINE GUN MOUNT FOR AIRCRAFT
Filed March 27, 1930  2 Sheets-Sheet 1
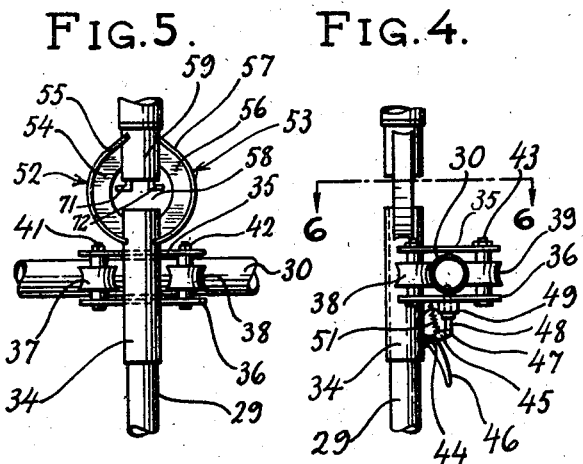
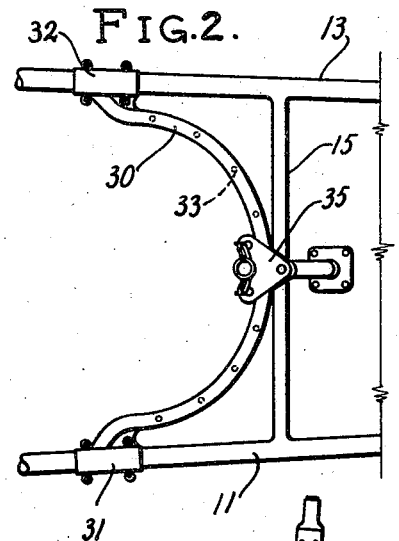
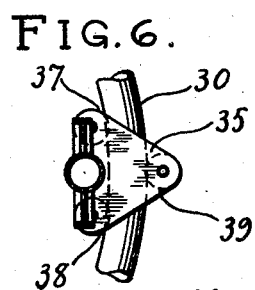
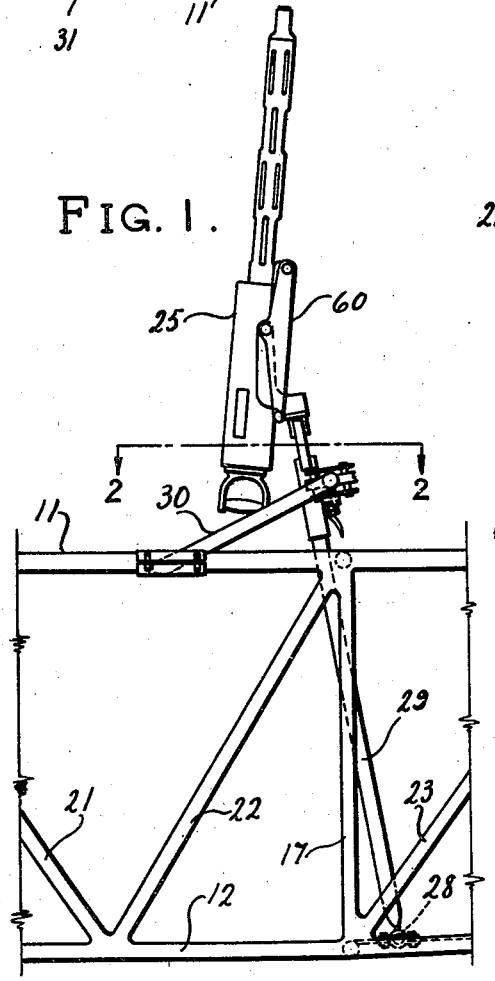
INVENTOR
CLEM G. TRIMBACH
BY
ATTORNEY March 21, 1933.  C. G. TRIMBACH  1,902,107
MACHINE GUN MOUNT FOR AIRCRAFT
Filed March 27, 1930  2 Sheets-Sheet 2
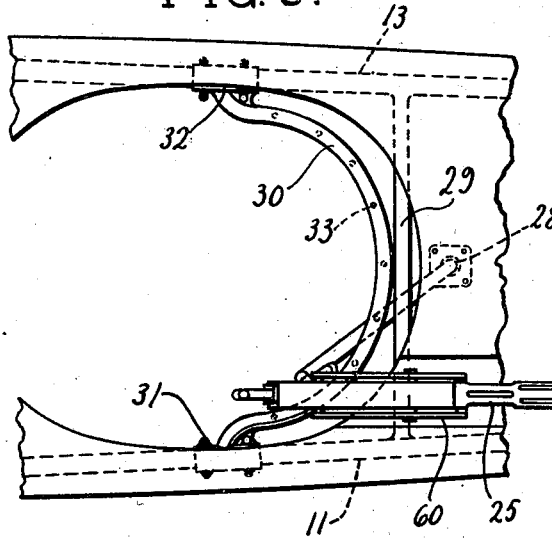
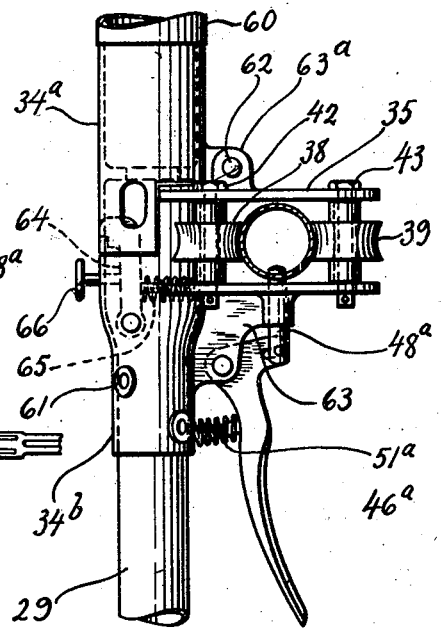
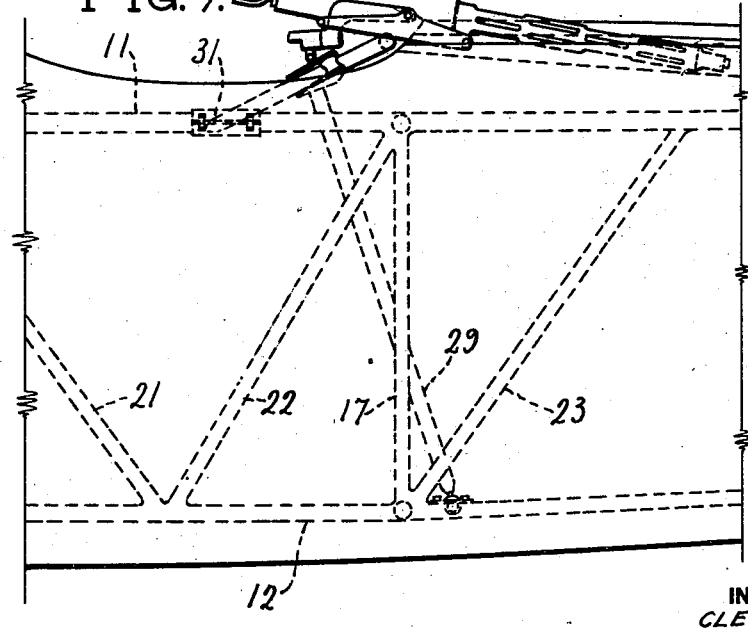
INVENTOR
CLEM G. TRIMBACH
BY
ATTORNEY Patented Mar. 21, 1933

1,902,107

UNITED STATES PATENT OFFICE

CLEM G. TRIMBACH, OF HEMPSTEAD, NEW YORK, ASSIGNOR TO CURTISS AEROPLANE & MOTOR COMPANY, INC., A CORPORATION OF NEW YORK

MACHINE GUN MOUNT FOR AIRCRAFT

Application filed March 27, 1930. Serial No. 439,299.

This invention relates to military aeronautics and more particularly to mounts for machine guns to be used on aircraft.

Prior to my invention the usual form of a mount for a machine gun for an airplane was that known as the ring mount. This form of mount is subject to several well known disadvantages. It is very difficult for the gunner to climb out of a cockpit equipped with the ring mount. It is almost impossible to rotate the gun except when it has been depressed for substantially horizontal firing. It is necessary for the gunner, while operating it, to stand in the cockpit to a large extent exposed to the fire of enemy airplanes. It is difficult to move the gun mount about its vertical axis at any time and it is extremely difficult to rotate it against the air blast from the propeller while the airplane is in flight.

One of the objects of my invention is to provide an improved mount for a machine gun capable of supporting the gun against the attraction of gravity and of maintaining it when desired substantially fixed against the air forces and the vibration caused by the firing of the gun itself.

A further object of my invention is to provide a mount for a machine gun so arranged that the machine gun will be capable of efficient fire throughout a relatively large range.

A further object of my invention is to increase the flexibility of machine gun operations, while the gun remains secured to its mount in the cockpit of an airplane. To accomplish this object I so arrange the parts that the force of gravity tends to counterbalance the force of the wind stream upon the gun. Furthermore, I so arrange the parts that when the gunner is engaged in overhead firing, the gun mount is automatically raised and when the gunner is engaged in downward firing over the sides of the airplane, the gun mount is automatically depressed.

A further object of my invention is to minimize the space taken from the cockpit of the airplane by the machine gun mount in order that greater space may be available for photographic, radio and other apparatus. It is also an object of the invention to rearrange the parts so that said space available for radio, photographic and other apparatus shall be located conveniently for their operation by the observer. As shown the gun mount does not substantially restrict the shape and size of the cockpit nor does it require special design of the usual cockpit and fuselage structure. By a special retractible feature, provision is made so that when not in use the gun may be moved rearward and downward into a pocket in the cowling aft of the gunner's cockpit thus clearing the cockpit of obstructions and reducing head resistance.

Further objects of the invention include the reduction of weight of the machine gun mount; the simplification of installation and removal; and the reduction of the size of the cockpit opening.

Further objects will be apparent from a reading of the subjoined specification and claims and from a consideration of the drawings.

In order to explain the invention more clearly, one embodiment thereof is shown in the accompanying drawings, in which:

Fig. 1 is a side elevation of a part of an airplane equipped with a gun mount constructed according to my invention;

Fig. 2 is a plan view of the part of the airplane shown in Fig. 1 with the machine gun removed from its mounting;

Fig. 3 is a front elevation of the part of the airplane and the apparatus shown in Fig. 1;

Fig. 4 is a view of a part of the apparatus as shown in Fig. 1, on an enlarged scale to show details of the roller bearings and locking device;

Fig. 5 is a view similar to Fig. 4 taken at right angles thereto to show more particularly the adapter mount and the roller bearings;

Fig. 6 is a horizontal sectional view taken substantially on the line 6—6 of Fig. 4;

Fig. 7 is an elevation of a part of an airplane equipped with a different form of mount which is also constructed according to my invention;

Fig. 8 is a plan view of part of the fuselage shown in Fig. 7; and

Fig. 9 is an elevation of a detail of the mount of Fig. 7 shown on an enlarged scale.

The drawings illustrating my invention show part of an airplane equipped with longérons 11, 12, 13 and 14, with horizontal bracing elements such as the struts 15 and 16, with vertical bracing elements such as struts 17 and 18, and with diagonal bracing elements such as the struts 21, 22 and 23. The airplane fuselage is also provided with a floor 24.

The part of the airplane which is disclosed by these drawings is that adjacent to the observer's cockpit. There is provided for the use of the observer a machine gun 25 (Figs. 1 and 3), which gun may be of any preferred type. I provide means to support the weight of the machine gun. Secured to the floor 24 as by the bolts 26 and 27 is a ball socket 28 in which is mounted a ball formed on the lower end of a hollow rod or tube 29. Thus, the tube 29 is securely fastened for substantially universal movement about the ball at its lower end. As will be described later, the machine gun 25 is mounted on the upper end of the tube 29 and is thus supported though capable of easy movement throughout a considerable range. If desired, the ball socket 28 may be mounted in a spider attached to the longérons instead of requiring the continuation of the floor back to this point.

Means are provided for guiding the upper end of the tube 29 and consequently the movement of the machine gun. Securely fastened to the longérons 11 and 13 as at 31 and 32, is an arcuate guide rod 30. The rod 30 is provided with a plurality of holes 33 in the under side thereof for purposes later to be described, the holes being indicated by dotted lines in Fig. 2. A sleeve 34 is placed over the upper end of the tube 29 and may be securely fastened thereto as by bolts, if desired. Welded to the sleeve 34 and extending substantially perpendicularly therefrom are a pair of parallel plates 35 and 36 of substantially triangular shape (see Figs. 2 and 4). Supported for free rotation between the plates 35 and 36 are three roller bearings 37, 38 and 39. The bearings 37 and 38 are adapted to contact with the forward side of the guide rod 30 while the other bearing 39 is adapted to contact with the rear side thereof. The roller bearings may be held in position by bolts such as the bolts 41, 42 and 43. Thus, it is possible for the sleeve 34 to move in a course adjacent to and substantially parallel to the guide rod 30 and therefore the course of the upper end of the tube 29 and of the machine gun 25 is limited to the desired path of movement.

I provide means for locking the gun mount at any desired position. As stated the arcuate guide 30 has formed on the under side thereof a plurality of holes 33. Pivotally mounted on the sleeve 34 as at 44, is a bell crank lever 45 having a hand grip 46. The opposite end of the bell crank lever 44 from the grip 46 is pivotally attached as at 47 to a plunger 48 mounted for substantially vertical sliding movement through a bearing 49 secured to the plate 36. The plate 36 itself is provided with an aligned hole through which the plunger 48 may project upward. Attached to the bell crank lever 44 is a spring 51 which serves to urge the plunger 48 upward to enter the selected one of the holes 33. Thus, when the grip 46 is clasped, the plunger 48 is withdrawn from the hole 33 in which it was previously inserted. Thereupon the mount may be moved by movement of the tube 29 about the ball bearing at 28 along the arcuate guide 30 until a proper position is attained, when, upon release of the grip 46 the plunger 48 will enter a new selected hole 33 and thus again lock the mount. Only one hand is necessary to compress the grip and move the tube 29 while the other may be retained upon the machine gun.

A special type of fitting for the adapter of the machine gun is provided. Secured to the upper end of the sleeve 34, as by welding, are a pair of T-shaped braces 52 and 53, each formed of a pair of strips of metal welded perpendicularly to each other. Thus, the brace 52 is formed of the strips 54 and 55 and the brace 53 is formed of the strips 56 and 57. Both of these braces are bent in the form of an arc so that a substantially circular opening 58 is formed between them. Secured to the upper end of the two braces 52 and 53 is a section of tube 59 similar to the sleeve 34. The adapter 60 for the machine gun 25 (as shown in Fig. 1) is so constructed that the gun may rotate about two perpendicular axes even while the mount is fixed and so that the gun may be aimed as desired. The lower part of the adapter is formed with a pair of jaws 71 and 72 which spring apart to grip the edge at the lower end of the tube 59 but the operator may reach in the hole 58 and compress the jaws to release the adapter when desired.

It is thought that the operation of the device illustrating my invention will be apparent from the above description. The observer may be seated within the cockpit of the airplane attending to other duties such as photography or radio. The machine gun may, if desired, be maintained positioned on the mount. On the other hand, it may be preferred to carry the gun off of the mount within the fuselage. If so, when necessity arises the gun may be quickly raised and the jaws of the adapter inserted within the tube 59. The observer may then grasp the hand grip 46 and move the mount to its most advantageous position. Thus, if it is desired to fire over one side, the most advantageous position is with the mount adjacent to that side of the airplane. If it is desired to fire overhead, the most advantageous position is in the center of the guide 30. For intermediate fire, intermediate positions on the guide may be desirable. The force of the wind stream from the propeller aids in moving the gun upward along the track 30 to its elevated position for upward firing and the weight of the gun aids in moving it downward against the wind stream to the positions at the side.

It is thus clear that the shape and arrangement of the guide 30 is such that the mount for the machine gun is in a sense automatically elevated whenever it is desired to fire overhead and similarly depressed whenever it is desired to fire over the sides of the fuselage. Thus, it is possible for the gunner easily to put himself in position above the gun when he is firing downward and easily to put himself in position below the gun when he is firing upward. This change of position of the mount insures that the gunner shall at all times receive the maximum protection possible from the fire of the enemy. Moreover, the shape of the guide is such (as may be clearly seen in Fig. 2) that when the gunner desires to fire partially forward he may place his body within the curvature of the guide and thus position himself back of the gun mount in the most convenient position for firing forward.

It is to be especially noted that the mount for the gun takes very little space in the cockpit, the support 29 extending forward out of the way of any other apparatus that may be required. The logical place for the camera to be used in photographic missions is in the floor of the fuselage just back of the post 29. Thus, the camera may be positioned in the most convenient place without interference with the gun mount and without the gun mount interfering with the operation of the camera. Radio equipment may similarly be placed in a convenient position. Moreover, the shape of the guide and the position of the support and of the gun are such that they do not interfere with the ingress or egress of the observer to and from the cockpit.

The mounting upon the roller bearings 37, 38 and 39 and in the ball bearing socket 28 is such that substantially free movement is insured and the tendency of the mount to bind or jam is substantially eliminated. On the other hand the lock plunger 48 insures that the mount shall be securely fixed when it is desired to use the gun in any desired position, without danger of the mount moving until the lock is released. As soon as the gunner desires, however, he may by operation of the handle 46 immediately release the lock mechanism in order to readjust the position of the mount.

In the modification of my invention shown in Figs. 7, 8 and 9 like parts are designated by the same numerals as are used in Figs. 1 to 6, inclusive. The grip 46$^a$ is similar to the grip 46, although a slight change in shape has been made therein. The grip 46$^a$ is mounted on a bracket 63 formed on the sleeve 34$^b$ and is connected to the plunger 48$^a$ which is urged into locking position by the spring 51$^a$. The sleeve 34 is formed in two parts and comprises an upper part 34$^a$ and a lower part 34$^b$. The upper part of the sleeve 34$^b$ is formed as one half of a cylinder and the lower part of the sleeve 34$^a$ is adapted to fit within said semicircle extension 34$^b$ of the sleeve as may be seen by reference to Fig. 9. This construction insures alignment and rigidity. The lower part is secured to the tube 29 in any suitable manner as, for instance, by rivets 61. The upper part 34$^a$ is hinged at 62 on a bracket 63$^a$ which is formed on the plate 35 in turn secured to the sleeve 34$^b$. Thus, the upper part of the sleeve 34$^a$, the adapter 60 and the machine gun 25 may be turned about the hinge 62 to position the machine gun in a pocket formed in the cowling of the fuselage and thus to remove it to a large extent from the cockpit, and effect of the air stream flowing over the fuselage. A latch 64 serves normally to maintain the upper part of the sleeve 34$^a$ in contact with the lower part 34$^b$ as is shown in Fig. 9 and a spring 65 serves normally to hold the latch in locking position. A button 66 is provided by which the spring 65 may be contracted and the latch released.

The operation of this form of my invention is similar to that described in connection with the form shown in Figs. 1 to 6, inclusive. However, when the machine gun is not needed the latch 64 may be unlocked and the machine gun, the adapter and the upper part 34$^a$ of the sleeve may be folded back so that the gun presents a minimum amount of interference to the observer, and wind resistance. Thereafter, as may be clearly seen from Fig. 8, it is comparatively easy for the gunner to quickly draw the gun back into its normal position by pulling back directly on the gun handles until the parts 34$^a$ and 34$^b$ of the sleeve are aligned as shown in Fig. 9. Thereupon, the latch 64 snaps into position to lock the parts of the sleeve together and the gun is ready for firing.

It is to be understood that the above described embodiment of the invention is for the purpose of illustration only and various changes may be made therein without departing from the spirit and scope of the invention.

I claim as my invention:

1. In a mount for a machine gun for an airplane, a support for said machine gun, means for guiding said support, and means for attaching the machine gun to the said support comprising an adapter for said machine gun equipped with resiliently spreading jaws, a tubular element spaced from said support and into which the said jaws are adapted to be inserted, and braces securing said tubular member to the said support.

2. In a mount for a machine gun for an airplane, a support for said machine gun comprising a lower sleeve, an upper sleeve, a hinge by which the upper sleeve is mounted upon the lower sleeve, and means carried by the upper sleeve for directly supporting the machine gun.

3. In combination, an airplane including a fuselage, a machine gun, a guide secured to said airplane for movably supporting said machine gun, and means for mounting said machine gun on said guide including a hinge, said fuselage being formed with a pocket into which said machine gun may be retracted when not in use.

4. In an airplane, in combination, a fuselage, a cockpit in said fuselage, and a machine gun mount for said cockpit comprising a support pivoted to the bottom of said fuselage rearwardly of said cockpit, said support extending upwardly above the edge of said cockpit, a guide attached to said fuselage adjacent the sides of said cockpit and slanting upwardly and rearwardly to a point above the rearward edge of said cockpit, rollers carried by said support for engaging said guide, a locking device carried by said support and engageable with said guide for holding said support in adjustably fixed relation with respect to said guide, a sleeve hinged to said support above said rollers, and means for locking said sleeve with respect to said support, said sleeve being adapted to releasably hold said machine gun.

5. In an airplane, in combination, a fuselage, a cockpit in said fuselage, and a machine gun mount for said cockpit comprising a support pivoted to the bottom of said fuselage rearwardly of said cockpit, said support extending upwardly above the edge of said cockpit, a guide attached to said fuselage adjacent the sides of said cockpit and slanting upwardly and rearwardly to a point above the rearward edge of said cockpit, rollers carried by said support for engaging said guide, a locking device carried by said support and engageable with said guide for holding said support in adjustably fixed relation with respect to said guide, and means associated with the upper end of said support for releasably holding said machine gun.

In testimony whereof I hereunto affix my signature.

CLEM G. TRIMBACH.